United States Patent [19]

Hall

[11] Patent Number: 4,941,645

[45] Date of Patent: Jul. 17, 1990

[54] PIANO LIFTING AND TRANSPORTING APPARATUS

[76] Inventor: Dan M. Hall, 1400 Beverly Garden Dr., Metairie, La. 70002

[21] Appl. No.: 217,311

[22] Filed: Jul. 11, 1988

[51] Int. Cl.$^5$ .......................... B60P 3/00; B66C 1/00
[52] U.S. Cl. .................................. 254/324; 254/338; 294/67.2; 414/460
[58] Field of Search ............... 254/213, 219, 222, 223, 254/226, 227, 286, 323, 324, 325, 326, 327, 334, 375, 376, 338; 414/458, 459, 460, 461; 294/67.2, 67.3, 82.1

[56] References Cited

U.S. PATENT DOCUMENTS

| | | | |
|---|---|---|---|
| 209,519 | 10/1878 | Sands | 254/324 X |
| 606,858 | 7/1898 | Edwards | 414/459 |
| 616,972 | 1/1899 | Raynor | 414/458 |
| 1,101,217 | 6/1914 | Stamm | 254/279 |
| 1,273,143 | 7/1918 | Bryan | 254/376 X |
| 1,288,628 | 12/1918 | Lovering | 254/325 |
| 2,276,127 | 3/1942 | Wahl | 254/327 X |
| 2,305,284 | 12/1942 | Trabant | 414/458 X |
| 2,333,208 | 11/1943 | Spear | 414/460 |
| 2,450,690 | 10/1948 | Robins | 414/458 |
| 2,706,057 | 4/1955 | Belding | 414/459 |
| 3,191,787 | 6/1965 | Stearn | 414/460 |
| 3,973,754 | 8/1976 | Chadwick | 254/323 |
| 4,050,587 | 9/1977 | Moen | 254/325 X |

FOREIGN PATENT DOCUMENTS 285324  1/1953  Switzerland ................. 414/458

Primary Examiner—Joseph J. Hail, III
Attorney, Agent, or Firm—Keaty & Keaty

[57] ABSTRACT

The invention relates to a device for lifting and transporting heavy objects, such as a piano with the use of a hoist mechanism mounted on the frame which straddles the piano. The frame is mounted on casters to allow easy rolling of the frame along a horizontal surface, while the piano is being secured within the frame in a suspended position through the use of the lifting bar engaging the piano about its rear horizontal frame post. Pendulous movement of the piano is prevented by the use of a pair of horizontal cross bars secured to vertical posts of the frame in the lower and upper portions thereof.

4 Claims, 3 Drawing Sheets

PIANO LIFTING AND TRANSPORTING APPARATUS

BACKGROUND OF THE INVENTION

This invention relates in general to load carrying devices and more particularly to an apparatus for lifting and transporting a piano.

Piano moving under current practices is an awkward, difficult and dangerous procedure. Normally, a piano is lifted off the ground manually and placed on a dolly or a wheeled platform for transporting from one location to another. At the new location, the piano is lifted off the dolly by hand and lowered to the ground. Since average pianos weigh 500 lbs. or more, lifting a piano on and off a dolly is an arduous procedure that requires several strong people. Individuals moving their household goods from place to place must often call for a special crew of laborers just to move their piano for them at a considerable extra expense. Businesses such as musical instrument stores and piano sales and rental outlets must employ extra laborers solely for the purpose of moving pianos. The currently utilized procedure carries a substantial danger of injury to the work crew and to the piano itself. Workers can strain and injure their back while lifting a piano. The piano and dolly are unstable while a piano is being lifted onto the dolly and can tip or fall over. Moreover, the piano being transported on a dolly is exposed on all sides to damage from contact with objects such as sharp corners. Even a small scratch or scrape on a polished finish of a piano can substantially reduce its value.

Additionally, pianos are often tuned at a store before they are delivered to a buyer, and considerable care should be taken not to incline the piano to such a degree as to permit it to be out of tune when it arrives at its final destination in the buyer's house.

A combination of a dolly structure and lifting means for raising and transporting objects relative to a horizontal surface is known from, for example, U.S. Pat. No. 1,101,217 issued to Stamm which discloses a burial apparatus for engaging, raising and lowering a casket and for transporting a casket above the ground; from U.S. Pat. No. 3,191,787 issued to Starn and U.S. Pat. No. 2,333,208 issued to Spear which disclose means of grasping, lifting and transporting pipe sections, U.S. Pat. No. 3,973,754 issued to Chadwick which discloses a device for transporting heavy electrical equipment such as transformers, and U.S. Pat. No. 4,050,587 issued to Moen which discloses a hoist and dolly apparatus for lifting and transporting objects of various sizes, shapes and weights.

The task of lifting and transporting a piano involves several specific problems that are not addressed by the above-mentioned patents. First of all, because a piano is a highly polished and finished piece of furniture, it should only be grasped, held or hooked on a few specific parts of its frame designed for that purpose. A piano cannot be lifted straight up from the top, front, or side because a lifting mechanism attached to the piano at those points would scratch the finish. The most accessible point for lifting by on a hoisting cable is a horizontal frame post at the rear of the piano. The problem is that this hooking point is off centered from the center of gravity of the piano so that if the piano is lifted by a hook attached to the horizontal frame post, the point where the hook is attached will act as a pivot point and the bottom rear of the piano will swing inward and the top front of the piano will swing outward around that point, causing a pendulous movement of the piano, which may cause mistuning of a piano. Further, a piano that is moved from one place to another is commonly moved indoors, often through narrow doorways, hallways and other passageways. Therefore, a lifting and transporting device for a piano must conform substantially to the dimensions of the piano in its length and width and not protrude substantially beyond the dimensions of the piano.

SUMMARY OF THE INVENTION

It is, therefore, an object of this invention to provide a lifting and transporting apparatus for safe and easy moving of a piano.

It is a further object of this invention to provide an apparatus that allows a piano to be lifted in a stable upright orientation restrained from pendulous movement.

It is a further object of this invention to provide an apparatus that conforms substantially to the width and length of the piano so that it will fit in doorways, hallways, corners and other spaces where the piano itself would fit.

It is a further object of this invention to provide an apparatus that is padded on all support members that might contact the polished, finished surface of a piano.

These and other objects of the present invention are achieved by the provision of a frame structure in a substantially inverted U-shape configuration, so that the frame straddles a piano. Vertical support members of the frame structure are mounted on caster, so that the apparatus can be moved horizontally in all directions. A hand driven or motor driven winch on top of the frame connects with a horizontal bar or brace having hooking members for grasping onto the horizontal frame post at the rear of the piano. A removable horizontal support bar attaches across the bottom portion of the rear vertical support bars to keep the rear of the piano from swinging backwards when it is lifted. A horizontal support bar attached across the front of the frame between the front vertical support members prevents the piano from swinging in a forward direction. This horizontal support member and all other support members that are likely to come in contact with the finish of the piano are padded, so that they do not scratch the surface of the piano.

DETAILED DESCRIPTION OF THE PREFERRED EMBODIMENT

Figure 1:
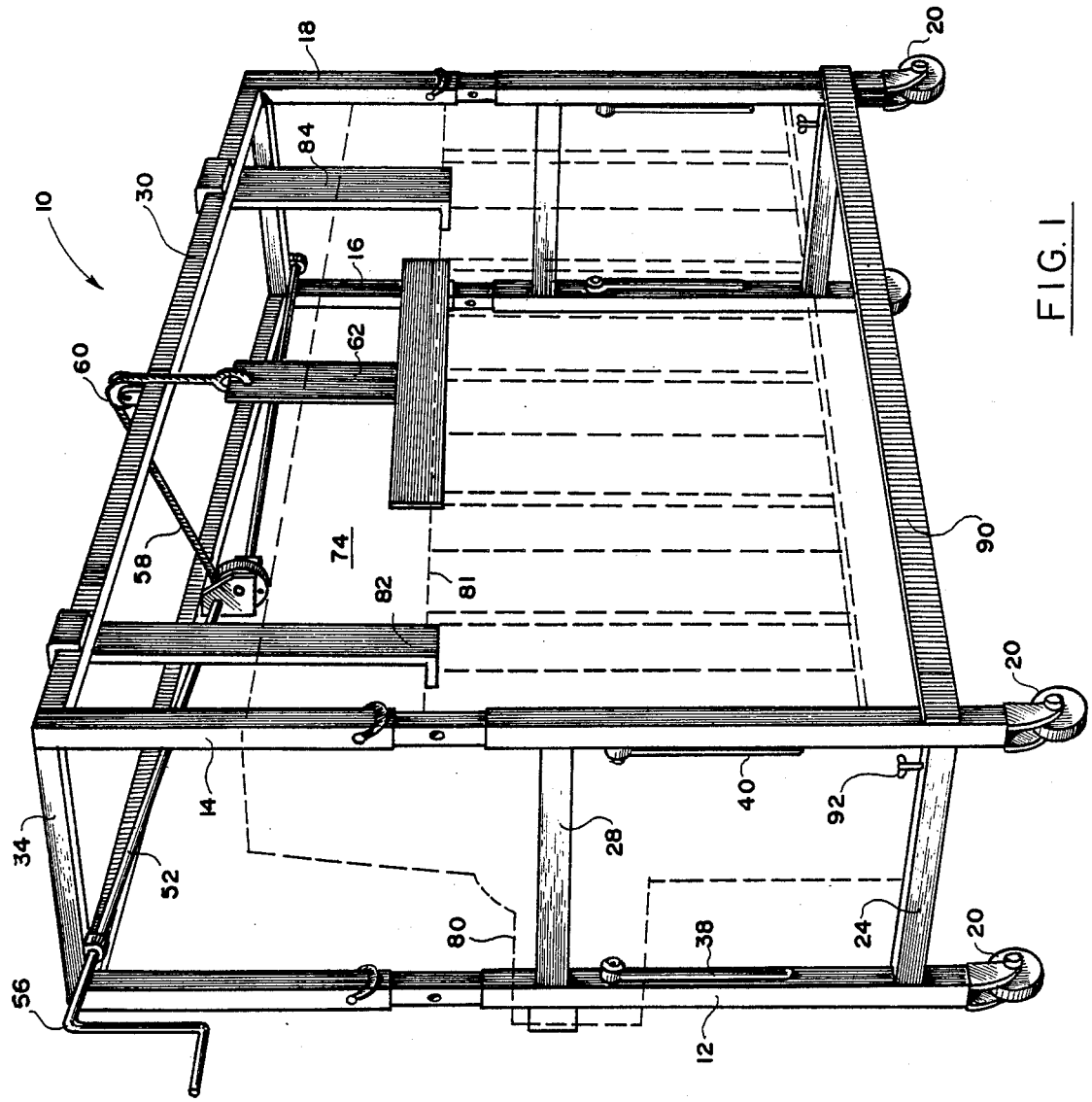
FIG. 1 is a rear perspective view of the lifting and transporting apparatus of the present invention, with a lifted piano shown in phantom lines.
Figure 2:
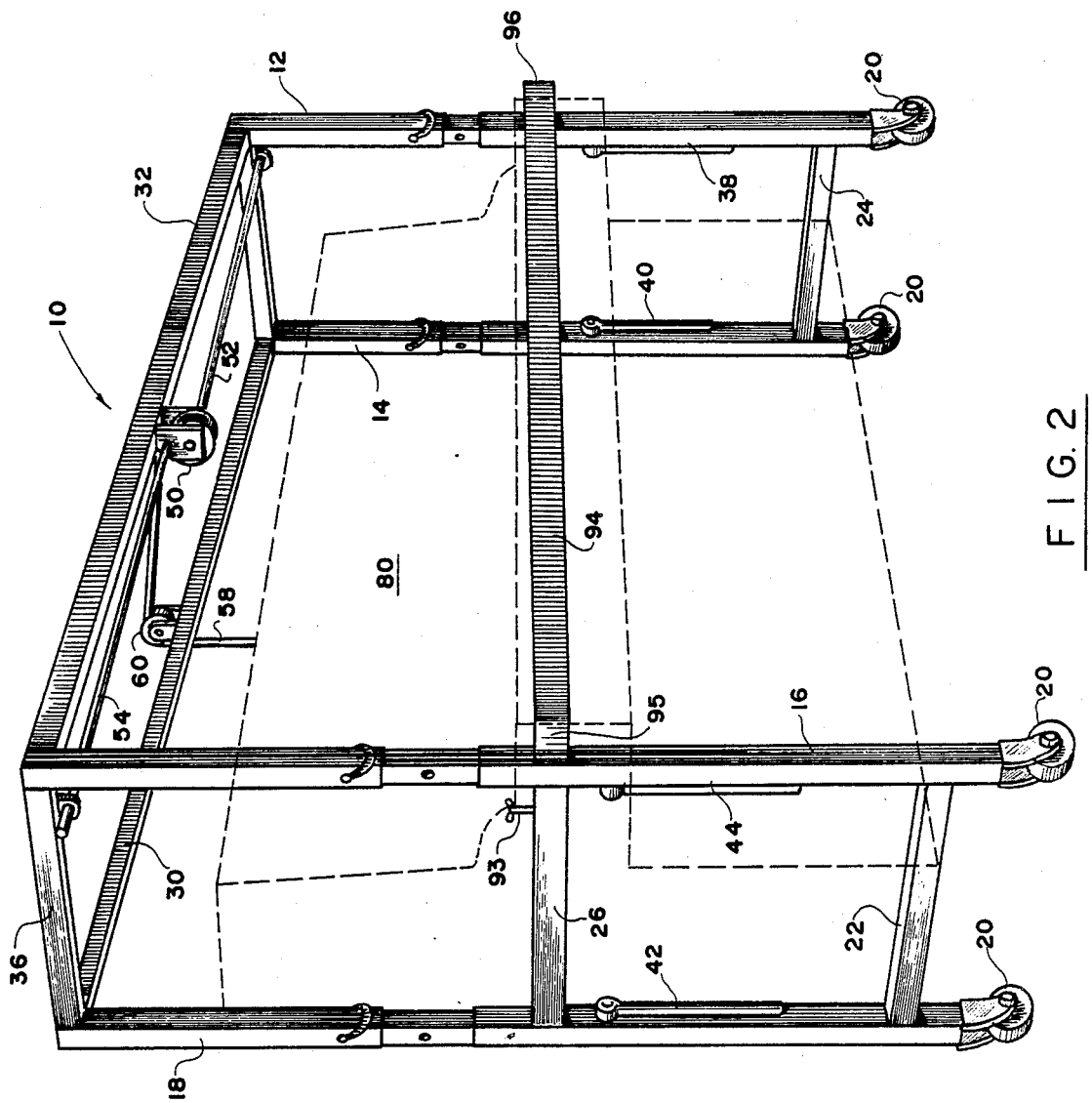
FIG. 2 is a detailed front perspective view of the apparatus of the present invention with a lifted piano shown in phantom lines.
Figures 3, 4:
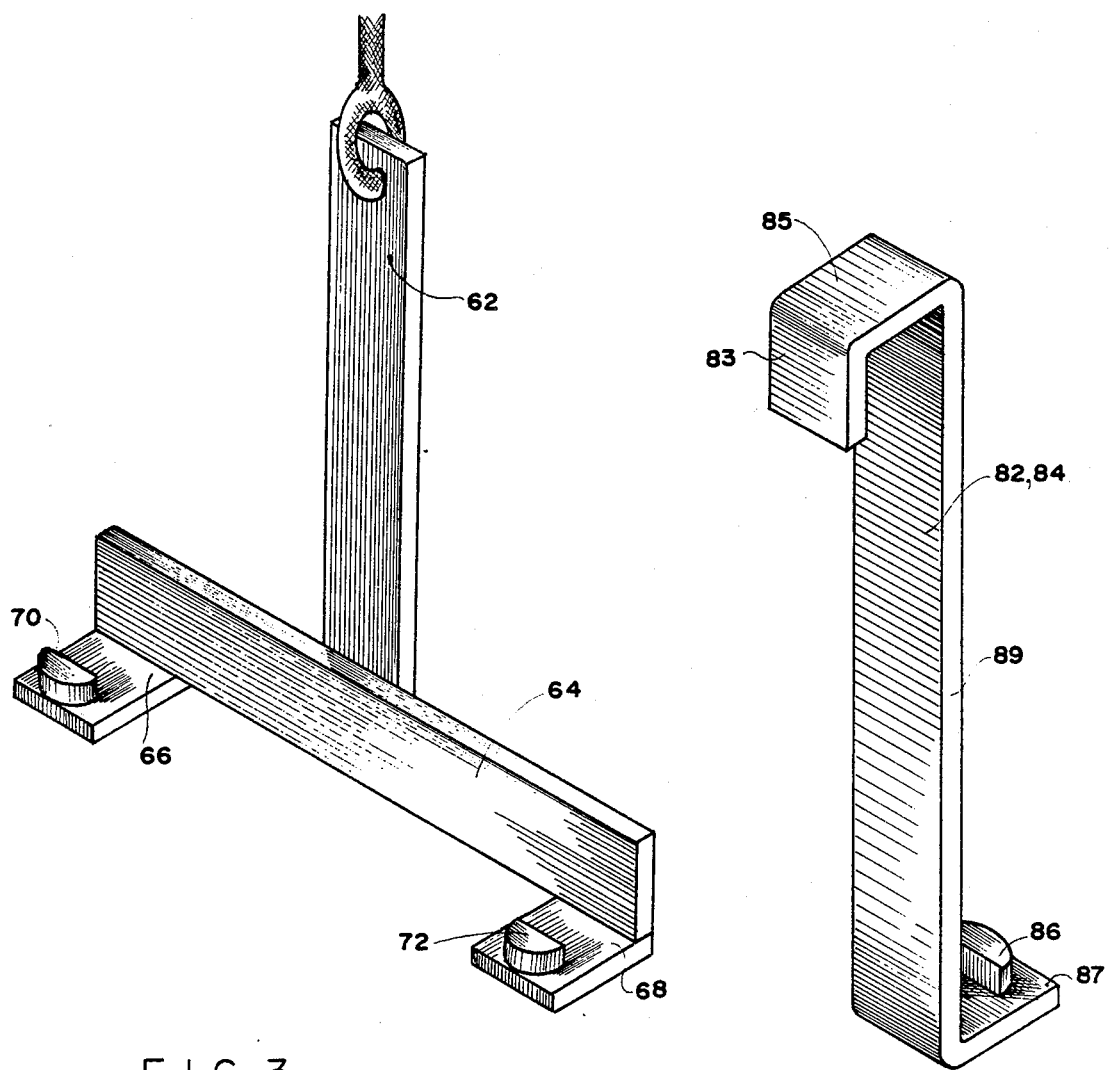
FIG. 3 is a perspective view of a T-shaped lifting bar.
FIG. 4 is a perspective view of a safety or suspension bar.

Referring now to the drawings in detail, the lifting and transporting apparatus of the present invention is designated generally by the numeral 10.

The apparatus 10 has four vertical posts 12, 14, 16 and 18, each mounted on casters 20.

The vertical posts are braced together by lower braces 22 and 24 rigidly attached to lower portions of supports 16, 18 and 12, 14, respectively.

Further support to the vertical posts is provided by middle braces 26 and 28 which are rigidly attached to the posts 16, 18 and 12, 14, respectively, a distance above the braces 22 and 24. The upper portion of the posts 16, 18, 12 and 14 carries a rectangular frame top which has a pair of parallel longitudinal bars 32 and 30, which constitute the front and rear longitudinal bars, respectively.

Perpendicularly to the posts 12, 14, 16 and 18 and in parallel to the braces 22, 24, 26 and 28 are upper braces 34 and 36 which are also rigidly attached to the posts 12, 14 and 16, 18, respectively, thus completing the general frame structure.

The height of the vertical posts 12, 14, 16 and 18 can be varied, depending on the height of the piano which is transported through the use of telescopically extendable segments forming the vertical posts. The telescopic connection can be accomplished at a level above the middle braces 26 and 28, or at any other convenient level.

The length of longitudinal bars 30 and 32 should be sufficient to accommodate the longest upright piano but should not be much greater than the total length of the piano, so that the frame can easily fit into restricted space which will be occupied by the piano in a house, even in a corner position.

In order to facilitate rolling of the frame along a horizontal surface, a pair of pivotally attached handles 38 and 40 can be attached to the posts 12 and 14 and a similar pair of handles 42 and 44 can be attached to the opposing posts 16 and 18. When it is necessary to push or pull the frame, the handles 38, 40, 42 and 44 are grasped by hands of the operator and pivoted into a more convenient position, for example, to a 90° angle in relation to the vertical posts and maneuvering of the piano is easily accomplished.

Vertical movement of an upright or a console piano is accomplished through the use of a conventional winch 50 which is mounted on the longitudinal bar 32 and which has shafts attached to its gear mechanism and extending along the bar 32, with the ends of the shafts protruding through the upper braces 34 and 36. The shaft which protrudes through the brace 34 is designated by numeral 52 in the drawings, while a shaft which protrudes through the brace 36 is designated by numeral 54 in the drawings. The ends of the shafts are adapted for engagement with a crank handle 56, which can be detachably connected to the shaft 52 or 54, depending on the position of the frame, so that if the posts 16 and 18 face a corner location, the crank 56 is engaged with the shaft 52, while the crank 56 is engaged with the shaft 54 if the post 12 and 14 face a similar corner location. In this manner, operation of the winch is not inhibited by any restricted position of the piano. The winch is provided with a reverse gear switch (not shown), so that by changing the direction of torque applied to the crank 56, lifting or lowering of a piano is accomplished, depending on the desired procedure.

Extending from the winch 50 is a cable 58 which is run over a pulley 60 mounted on top of the longitudinal bar 30 in such a manner that the cable 58 does not frictionally engage the top surface of the longitudinal bar 30, but instead is allowed to freely roll over the pulley 60 and downwardly over the bar 30.

Detachably secured to the cable 58 is a T-shaped lifting bar 62, one end of the vertical portion of which has an aperture to accommodate the cable passing through the aperture and secured at that end. The horizontal portion 64 of the bar 62 is provided with a pair of perpendicularly attached hook members 66 and 68. Fixedly mounted on a top surface of the hook member 66 and 68 are stop protrusions 70 and 72 positioned a distance from the horizontal portion 64 of the bar 62. The T-shaped bar 62 is adapted for "hooking" the rear horizontal frame post of an upright piano in such a manner that the stop members 70 and 72 frictionally engage the innermost surface of the frame post, while the edge of the horizontal frame post 74 of the piano 80 rests in the space between the portion 64 and the stops 70 and 72. The T-shape bar 62 is sufficiently strong to withstand the weight of the heaviest piano which can be an average of 500 lbs. and more.

A pair of removable safety or suspension bars 82 and 84 can be provided to further insure a safe position of the lifted piano 80. The bar 82 or 84 is a generally Z-shaped, with the upper portion of the bar having a downwardly extending lip 83 which is designed to "hook" the longitudinal bar 30, so that a portion 85 of the bar 82 or 84 rests on the top edge of the bar 30.

The lower horizontal portion of the bar 82 or 84, designated by numeral 87 in the drawing, is provided with a stop protrusion 86 which is similar to the stops 70 and 72 of the bar 62 and is fixedly attached a distance from the vertical portion 89 of the bar 82 or 84, the distance being sufficient to allow the lowermost edge of the frame post 74 and the piano 80 to rest thereon.

In order to prevent pendulous movement of the piano suspended by the T-shaped bar 62 and bars 82 and 84, a detachable horizontal rear cross member 90 is provided for detachable connection at the level of the lower braces 22 and 24. The cross member 90 can be connected to the post 14 and 18 by a conventional means, such as by a pin projecting through an aperture in the post 14 or 18 and secured in place by a wing nut 92 passing through the brace 22 and 24 and frictionally engaging a pin (not shown) in the interior of the braces 22 and 24.

A second, front cross member 94 is detachably connected to the post 12 and 16 at the level of the middle braces 26 and 28, which is generally on the level of the forward extending front of the piano 80. The horizontal cross bar 94 comprises a pair of side extensions 95 and 96, attached perpendicularly to the horizontal portion of the bar 94 to accommodate for the forward extending portion of the piano 80, which can vary in width depending on the model of the piano.

The cross member 94 can be conventionally attached to the posts 12 and 14, similarly to the cross member 90 through the use of a pin passing through an aperture made in the post 12 and 14 and secured in its place through the use of tightening wing nut 93 passing through the braces 26 and 28.

It is preferred that the braces 22, 24, 26, 28 and the horizontal cross member 94 be padded on the interior surface, so as not to damage the polished exterior of the piano 80. Likewise, the inwardly facing surfaces of the vertical posts can be padded to prevent any damage of the piano surface.

In operation, a frame 10, without the horizontal cross members 90 and 94, and with the T-shaped bar 62 in its retracted position is moved over the piano, so that it is placed in a position surrounding the piano on all four sides and the frame posts are substantially in parallel to the longitudinal axis of the piano 80.

A winch 50, which can be a hand-operated winch or an electrical winch, is then operated, releasing a length of the cable 58 and allowing the T-shaped bar 62 to be lowered over the longitudinal bar 30 to a distance, wherein the extensions 66 and 68 are substantially at the level of the lowermost end 81 of the piano back frame post 74. The rotation of the winch is then terminated, and the T-shaped bar 62 is moved into position, wherein the extensions 66 and 68 engage the edge 81 of the piano 80. Once secured, the T-shaped bar will support substantially the entire weight of the piano in a suspended position.

The winch 50 is then operated in reverse, pulling the cable 58 into its retracted position within the winch 50, thus causing the piano 80 to be lifted off of the ground. A pair of suspension bars 82 and 84 are then utilized, by also catching onto the back post frame 74 of the piano 80, at equal distance from the center, which is being engaged by the T-shaped bar 62. The bars 82 and 84 can carry the entire weight of the piano, if necessary.

After the piano 80 has been elevated to the desired level, the first horizontal cross member 90 is placed into its position, securing it into the posts 14 and 18, after which time the second, front horizontal cross member 94 is placed into position securing the piano on the front, thus preventing any pendulous movement of the piano suspended from the bars 62 and/or bars 82 and 84.

An operator then grasps handles 38 and 40 to push or pull the frame, with the suspended piano to any desired location, with the ease of movement facilitated by the provision of casters 20.

Once in place, the piano can be lowered to the ground by first disengaging the bars 82 and 84, and then operating the winch to extend the cable 58 and lower the piano 80 to the ground.

Subsequently, the bar 62 is released from its engagement with the frame post 74 and is moved upwardly, by the winch retracting the cable 58, until such time as the bar 62 is well above the top surface of the piano 80.

The horizontal bars 90 and 94 can then be safely removed and placed in their stored position, on top of the posts 12, 14, 16 and 18 and the frame 10 is rolled away from its surrounding position about the piano 80, leaving the piano in place of its destination.

In an alternative embodiment, the lifting apparatus can be shaped to accommodate a grand piano, turned on its side, with minor modifications to the frame itself.

It can thus be seen that the invention herein described provides an apparatus for lifting and transporting a heavy object, such as a piano, without heavy physical lifting and provides for a safe, stable apparatus which protects the piano while it is being moved, while not allowing it to be out of tune which may be caused by heavy pendulous movement of the piano or inclined movement.

The device is substantially small to safely pass through narrow hallways and doorways, since it does not exceed, to any substantial degree, the horizontal dimensions of a piano.

Many changes and modifications can be made in the design of the apparatus in accordance with the present invention without departing from the spirit and scope thereof. Therefore, the above description should be interpreted as illustrative only and not limiting to the scope of the invention which scope is defined by the accompanying claims.

I claim:

1. A device for lifting and transporting a piano comprising:
   an inverted U-shaped frame having a substantially rectangular portion and a pair of front and a pair of rear vertical posts;
   a wheel means connected to a free lower end of each of said vertical posts;
   a hoist means descending from a rear center of said horizontal top portion of the frame;
   a T-shaped lifting member connected to said hoist means, having a horizontal portion for engaging a rear horizontal frame post of the piano;
   a detachable rear horizontal cross member extending between lower portions of said rear vertical posts and a detachable front horizontal cross member extending between middle portions of said front vertical posts; and
   at least one detachable suspension bar adapted for suspension from the top portion of the frame and for engagement with the rear horizontal frame post of the piano a distance from said T-shaped lifting member.

2. The device of claim 1, wherein said front and rear vertical posts further comprise telescoping means for varying a height of the frame.

3. The device of claim 1, further comprising handle means to facilitate movement of the device along a horizontal 4. The device of claim 3, wherein said handle means comprise at least one bar pivotally connected to said front and rear vertical posts.

* * * * *